(12) United States Patent
Moffatt et al.

(10) Patent No.: US 9,417,054 B2
(45) Date of Patent: Aug. 16, 2016

(54) DIGITAL MEASUREMENT UNIT FOR FISH TAPE DEVICE OR DUCT RODDING DEVICE

(71) Applicant: Greenlee Textron Inc., Rockford, IL (US)

(72) Inventors: Wilbur Keith Moffatt, Freeport, IL (US); Nathan Daniel Gove, Rockton, IL (US)

(73) Assignee: TEXTRON INNOVATIONS INC., Providence, RI (US)

( * ) Notice: Subject to any disclaimer, the term of this patent is extended or adjusted under 35 U.S.C. 154(b) by 0 days.

(21) Appl. No.: 14/278,624

(22) Filed: May 15, 2014

(65) Prior Publication Data

US 2015/0330771 A1 Nov. 19, 2015

(51) Int. Cl.
*G01B 11/06* (2006.01)
*G01B 11/04* (2006.01)
*G01B 11/02* (2006.01)
*H02G 1/08* (2006.01)

(52) U.S. Cl.
CPC ............ *G01B 11/043* (2013.01); *G01B 11/022* (2013.01); *H02G 1/083* (2013.01)

(58) Field of Classification Search
CPC combination set(s) only.
See application file for complete search history.

(56) References Cited

U.S. PATENT DOCUMENTS

| | | | |
|---|---|---|---|
| 4,092,780 A | 6/1978 | Trethewey et al. | |
| 4,242,574 A | 12/1980 | Grant | |
| 4,747,215 A | 5/1988 | Waikas | |
| 5,142,793 A | 9/1992 | Crane | |
| 5,430,665 A * | 7/1995 | Jin et al. | 702/163 |
| D506,939 S | 7/2005 | King | |
| 7,609,250 B2 | 10/2009 | Choi | |
| 8,651,459 B2 | 2/2014 | Axon et al. | |

OTHER PUBLICATIONS

A4Tech, Optic 2.0 V-Track.
Picture of duct rodder dated May 11, 2010.

* cited by examiner

*Primary Examiner* — Tri T Ton
(74) *Attorney, Agent, or Firm* — Klintworth & Rozenblat IP LLC

(57) ABSTRACT

An assembly includes a fish tape device or a duct rodding device having digital measurement unit attached thereto. A tape is housed in the fish tape device or a duct rodding device and is paid out of the device. The digital measurement unit includes an optical sensor which is positioned proximate to the tape. As the tape is passed by the optical sensor, the optical sensor uses digital image correlation to take successive images of the tape to determine a length measurement of tape that has passed by the optical sensor.

20 Claims, 3 Drawing Sheets

DIGITAL MEASUREMENT UNIT FOR FISH TAPE DEVICE OR DUCT RODDING DEVICE

FIELD OF THE INVENTION

The present invention relates to an assembly which includes a fish tape device or a duct rodding device having digital measurement unit attached thereto. The digital measurement unit displays the length of tape paid out of the device or retracted into the device.

BACKGROUND OF THE INVENTION

An electrician or homeowner installs cables or wires through a wall or electrical conduit. To perform this task, a fish tape is typically used. The fish tape is unwound or paid out and fed through the wall or conduit. Once the end of the fish tape reaches its destination, the cables or wires are connected to the end of the fish tape. Then, the fish tape and connected wires are pulled back through the wall or conduit. This process is typically referred as a cable pull.

It is beneficial for the electrician to know the total length of the cable pull. This allows the electrician to confirm there is sufficient cable or wire length prior to starting the cable pull. Also, multiple wires could be cut from the same spool for one cable pull without wasting cable through inaccurate estimation of the total pull length. Wasted wire during a cable pull is costly. Another benefit is that the electrician can use the known length of the paid fish tape to locate an obstruction in the wall or conduit.

Often fish tape is damaged when pliers or other tools are used to aid in pulling the fish tape connected to cables and wires during a cable pull. This damage can eventually result in the fish tape breaking. The user can then reform the looped end on the remaining fish tape and continue using the fish tape. This reduces the overall length of the fish tape. Another benefit of the length measurement is to keep a record of the fish tape remaining within the case. As a result, the user does not waste time using a fish tape that does not have sufficient tape length for the cable pull.

U.S. Pat. No. 4,092,780 measures fish tape distance paid out through a mechanical device, which relies on mechanical friction for accurate readings. The measurement wheel must be in constant contact with the fish tape. As the fish tape is extended, the measurement wheel turns a mechanical display that indicates distance. This design is prone to inaccurate reading from the measurement wheel slipping during fast extension of the fish tape or contaminants on the fish tape. Also, continued frequent use will wear the measurement wheel and reduce the amount of friction available between the measurement wheel and the fish tape leading to increased amount of slipping and higher inaccuracies.

U.S. Design Pat. No. D506,939 provides dimensional marking directly on the fish tape. This allows the electrician the ability to accurately measure the pull length, however, this method requires a significant manufacturing cost to mark the tape and this method becomes more difficult for the user to identify total length if the fish tape has been broken and the laser numbers do not start from the original value.

Using an optical sensor to measure the length of a tape has been used in measurement tape devices, but not in fish tapes. For example, measuring tapes using optical sensors are provided in U.S. Pat. Nos. 4,242,574, 4,747,215 and 5,142,793. These devices are only capable of providing a distance measurement and use an optical sensor that requires a specific image or pattern to be located on the measuring tape for identifying distance paid out.

SUMMARY OF THE INVENTION

An assembly includes a fish tape device or a duct rodding device having digital measurement unit attached thereto. A tape is housed in the fish tape device or a duct rodding device and is paid out of the device. The digital measurement unit includes an optical sensor which is positioned proximate to the tape. As the tape is passed by the optical sensor, the optical sensor uses digital image correlation to take successive images of the tape to determine a length measurement of tape that has passed by the optical sensor.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE ILLUSTRATED EMBODIMENTS

Figure 1:
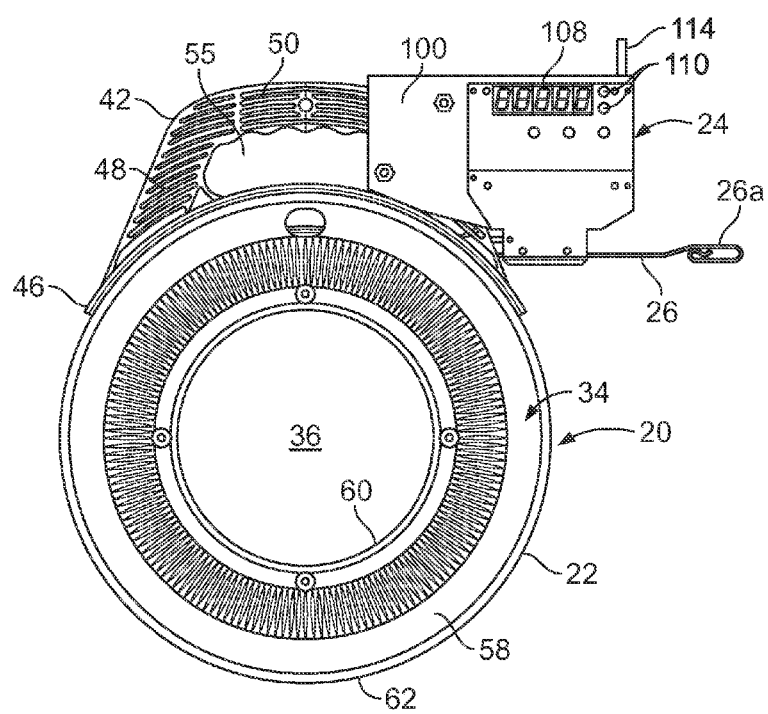
FIG. 1 is a side elevation view of an assembly including a fish tape device and a digital measurement unit which incorporates the features of the present invention.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein. Therefore, unless otherwise noted, features disclosed herein may be combined together to form additional combinations that were not otherwise shown for purposes of brevity.

Figure 3:
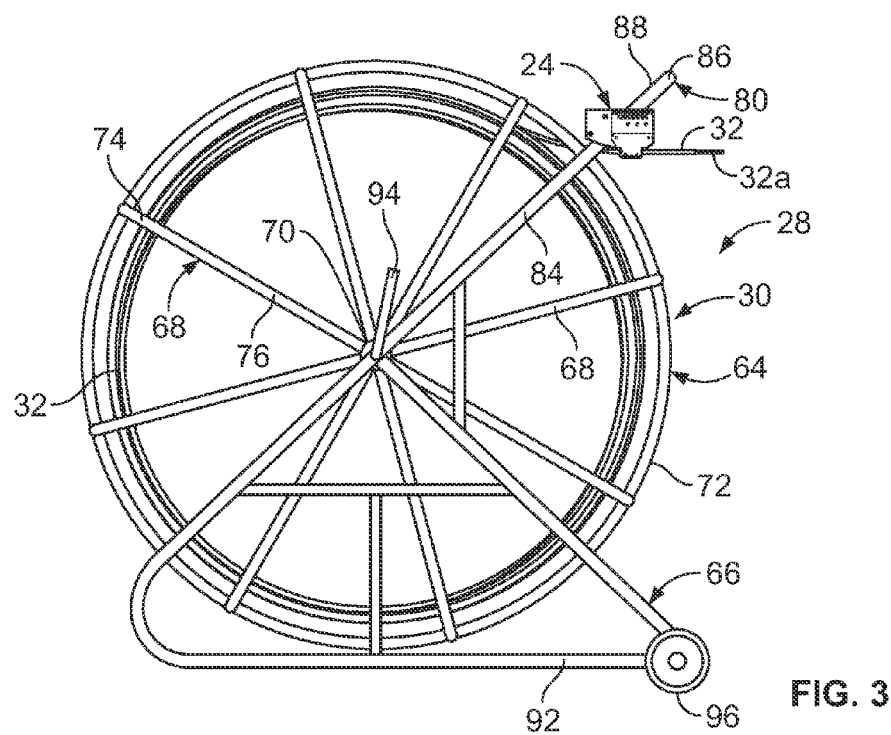
FIG. 3 is a side elevation view of an assembly including a duct rodder device and a digital measurement unit which incorporates the features of the present invention.
Figure 4:
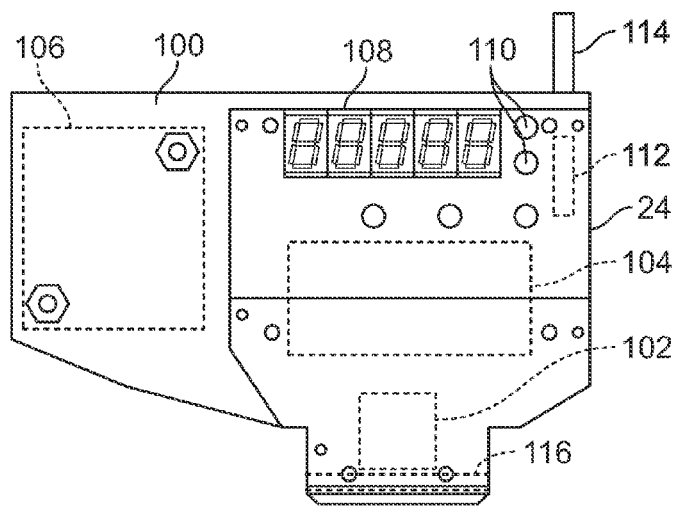
FIG. 4 is an enlarged view of the digital measurement unit showing components in broken line.
Figure 5:
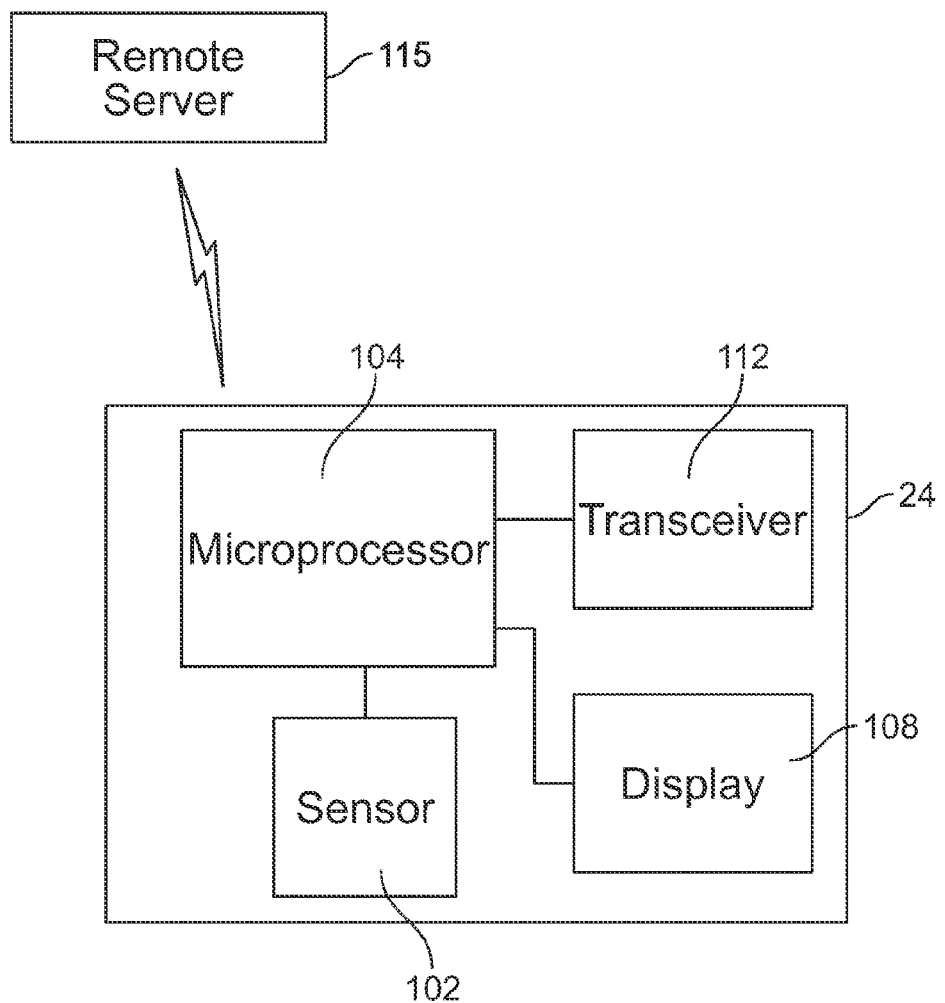
FIG. 5 is a block diagram of the components of the digital measurement unit and showing a remote server.

FIG. 1 shows an example of an assembly 20 which includes a fish tape device 22 and a digital measurement unit 24. As is known in the art, the fish tape device 22 is used to pay out fish tape 26, and the fish tape 26 can be retracted into the fish tape device 22 for reuse. Commonly, fish tapes 26 are approximately 200 feet in length, but such lengths may vary depending upon the application. An example of such a fish tape device 22 is disclosed in U.S. Pat. No. 8,651,459, which disclosure is incorporated by reference in its entirety. FIG. 3 shows an example of an assembly 28 which includes a duct rodder device 30 with the digital measurement unit 24. As is known in the art, the duct rodder device 30 is used to pay out pull tape 32, and the pull tape 32 can be retracted into the duct rodder device 30 for reuse. Commonly, pull tapes are approximately 2,000 feet in length, but such lengths may vary depending upon the application. The assemblies 20, 28 minimize pull length measurement inaccuracy issues, do not have a high manufacturing cost, and provide the user with information as to the amount of the unused tape 26, 32 left in the device 22, 30.

Attention is first invited to the embodiment showing the assembly 20 which includes a fish tape device 22 and a digital measurement unit 24.

The fish tape 26 is conventionally formed and includes a long strip of flexible material that has an eye or coupling 26a on one its free end. The fish tape 26 is preferably flat. The fish tape 26 of the present invention can be formed of steel, nylon, plastic, fiberglass, stainless steel, and flexible steel braid. The fish tape 26 preferably does not have dimensional markings thereon as they are not necessary for the present invention and only increase the cost of the fish tape 26, but if such dimensional markings are provided, such dimensional markings are not used in the present invention.

The fish tape device 22 includes a two-part housing 34 in which the fish tape 26 and a winding belt 36 are mounted. The housing 34 is annularly-shaped and has a central hole 36 in the middle. The housing 34 and the winding belt 36 may be made from polypropylene, ABS or another suitable plastic material. In addition, the winding belt 36 can be made of nylon.

Figure 2:
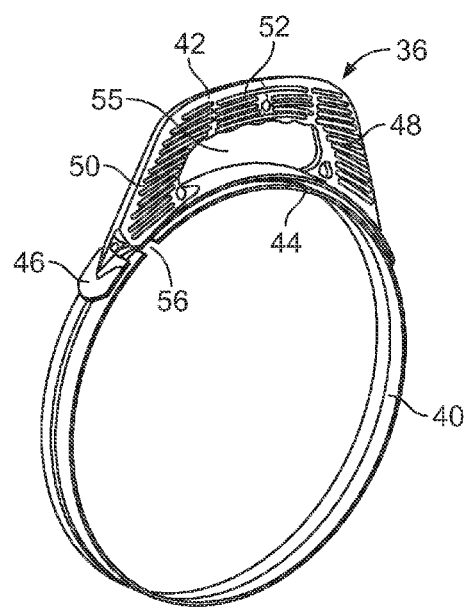
FIG. 2 is a perspective view of a winding belt which forms a portion of the fish tape device of FIG. 1.

As shown in FIG. 2, an embodiment of the winding belt 36 includes a continuous circular hoop 40 with a handle 42 attached thereto by a web 44. The web 44 extends radially outwardly from a midline of the hoop 40. The handle 42 is attached to an arcuate shoe 46 which is in turn attached to the web 44. The web 44 connects an underside of the shoe 46 to the hoop 40 such that the shoe 46 is radially spaced from the hoop 40. The handle 42 is configured to be grasped by the hand of the user and is generally U-shaped. The handle 42 includes a first and second portions 48, 50 extending from the shoe 46, and a third portion 52 connected to the ends of the first and second portions 48, 50. The third portion 52 is generally parallel to the shoe 46. An opening 55 for the user's hand is formed by the first, second and third portions 48, 50, 52 and the shoe 46. A slot 56 extends through one end of the handle 42 and extends through shoe 46, the web 44 and the hoop 40.

Each part of the housing 34 includes a circular outside wall 58, an annularly-shaped inner wall 60 which depends generally perpendicular from the outside wall 58, and an annularly-shaped outer wall 62 which depends generally perpendicular from the outside wall 58. When the two parts of the housing 34 are mated, the ends of the inner walls 60 abut each other, and the ends of the outer walls 62 are proximate to each other but spaced apart from each other such that a gap is formed therebetween. As disclosed in U.S. Pat. No. 8,651,459, the winding belt 36 is stored in a winding belt chamber formed in the housings 34 and the fish tape 26 is stored in a fish tape storage chamber in the housings 34. The web 44 of the winding belt 36 is seated within the gap between the parts, and the shoe 46 is proximate to the outer surface of the outer wall 62. The fish tape 26 is anchored to the housings 34 and is wound in the fish tape storage chamber. An end portion of the fish tape 26 exits the fish tape storage chamber and extends through the slot 56.

As shown in an embodiment, the digital measurement unit 24 is provided on the handle 42 proximate to the slot 56, but does not obstruct the user's hand opening 55. The digital measurement unit 24 can be formed as a separate member which is mechanically attached to the handle 42, or can be formed integrally with the handle 42. Alternatively, in another embodiment, the digital measurement unit 24 may be provided on or in the housing 34, the digital measurement unit 24 can be formed as a separate member which is mechanically attached to the housing 34, or can be formed integrally with the housing 34. In each location for the digital measurement unit 24, the fish tape 26 extends therethrough. As the fish tape 26 passes through the digital measurement unit 24, the digital measurement unit 24 is configured to determine the amount of fish tape material that has passed therethrough as described herein.

Attention is now invited to the embodiment showing the assembly 28 which includes a duct rodder device 30 with the digital measurement unit 24.

The pull tape 32 is conventionally formed and includes a long strip of flexible material that has an eye or coupling 32a on its free end. The pull tape 32 is preferably round. Like the fish tape 26 of the first embodiment, the pull tape 32 of the present invention can be formed of steel, nylon, plastic, fiberglass, stainless steel, and flexible steel braid. The pull tape 32 preferably does not have dimensional markings thereon as they are not necessary for the present invention and only increase the cost of the pull tape 32, but if such dimensional markings are provided, such dimensional markings are not used in the present invention.

The duct rodder device 28 includes a housing 64, formed as a cage, in which the pull tape 32 is mounted and a stand 68 for transporting the duct rodder device 28.

The housing 64 is formed from a plurality of connecting ribs 68 which are interconnected together at a central tube 70 and an outer rib 72 which is connected to the connecting ribs 68. Each connecting rib 68 has a curved base 74 with a leg 76 extending therefrom. The legs 76 are parallel to each other. The outer rib 72 is annular and is connected to the base 74 of each connecting rib 68, such that connecting ribs 68 extend from each side of the outer rib 72. The housing 64 is preferably formed of metal, such as steel, but may be formed of other materials. The pull tape 32 is wound and stored in a pull tape storage chamber formed by the connecting ribs 68, the central tube 70 and the outer rib 72. An end portion of the pull tape 32 exits the storage chamber as described herein.

A handle 80 extends outwardly from the housing 64. The handle 80 is configured to be grasped by the hand of the user and is generally U-shaped. The handle 80 is generally U-shaped and includes first and second portions 84 extending from the central tube 70, and a third portion 86 connected to the ends of the first and second portions 84. The first and second portions 84 are parallel to each other and are parallel to the first and second portions 76 of the ribs 68. The third portion 86 is generally parallel to the central tube 70. An opening 88 for the user's hand is formed between the first, second and third portions 84, 86 and the outer rib 72.

The housing 64 is mounted to the portable stand 66. As shown, the stand 66 has a pair of triangularly-shaped legs 92 (only one of which is shown in the side elevation view of FIG. 3) which has a central shaft extending between the upper ends thereof. The shaft is rotatably mounted in the central tube 70 of the housing 64. A handle 94, which can be rotated by a user to rotate the housing 64 relative to the portable stand 66, is attached to the shaft. The housing 64 can freely rotate relative to the stand 66. The legs 92 may have wheels 96 thereon to allow a user to easily transport the duct rodder device 30.

As shown in an embodiment, the digital measurement unit 24 is provided on the handle 80, but does not obstruct the user's hand opening 88. The digital measurement unit 24 can be formed as a separate member which is mechanically attached to the handle 80, or can be formed integrally with the handle 80. Alternatively, in another embodiment, the digital measurement unit 24 may be provided on or in the housing 64, the digital measurement unit 24 can be formed as a separate member which is mechanically attached to the housing 64, or can be formed integrally with the housing 64. In each location for the digital measurement unit 24, the pull tape 32 extends therethrough. As the pull tape 32 passes through the digital measurement unit 24, the digital measurement unit 24 is configured to determine the amount of pull tape material that has passed therethrough as described herein.

In each embodiment, the digital measurement unit 24 is formed of a housing 100, having a low cost optical sensor 102 mounted therein, a processor 104 provided therein, and a battery 106 for powering the digital measurement unit 24. The optical sensor 102 and the processor 104 are in communication with each other. A digital display 108 may be provided on the housing 100 and is in communication with the processor 104 for displaying information to the user. A user interface 110, which may be formed of buttons, a touch screen, etc., is provided on the housing 100 and is in communication with the processor 104 for allowing the user to toggle between readouts and settings. The digital measurement unit 24 may include a transceiver 112 and antenna 114. The transceiver 112 is in communication with the processor 104 and is used to convey the information via wireless signals using the antenna 114 to a server 115 which is remote to the digital measurement unit 24.

The housing 100 has a passageway 116 therethrough through which the tape 26, 32 extends. The optical sensor 102 is mounted in the housing 100 proximate to the passageway 116 so that the optical sensor 102 can sense the tape 26, 32 as the tape 26, 32 passes through the housing 100.

When the tape 26, 32 moves past the optical sensor 102, the optical sensor 102 provides a digital signal to the processor 104 indicating the distance the fish or pull tape material has been moved passed the optical sensor 102. The optical sensor 102 is an optoelectronic sensor, which may include one or more light-emitting diodes (LEDs) and an imaging array of photodiodes to detect movement relative to the underlying surface and an image capturing device therein, such as a camera. Alternatively, the optical sensor 102 is an optoelectronic sensor of the optical sensor 102 may include a coherent laser light and an image capturing device therein, such as a camera. The image capturing device uses digital image correlation to take successive images of the surface of the material being passed in front of the optical sensor 102 to determine the distance the material has moved passed the optical sensor 102. This technology is often found in computing field for use in an optical mouse and such a suitable optical sensor is disclosed in U.S. Pat. No. 7,609,250, which disclosure is incorporated by reference in its entirety. The optical sensor 102 of the present invention does not rely on a mechanical connection to measure distance or costly manufacturing equipment to add any patterns or dimensional markings to the fish tape 26 or pull rod 32. The optical sensor 102 of the present invention accurately reads different types of the fish tape or pull material, that is steel, nylon, plastic, fiberglass, stainless steel, and flexible steel braid.

The output of the optical sensor 102 is communicated to the processor 104. The processor 104 is configured to condition the signal and configured to calculate the length of tape 26, 32 that has been passed over the optical sensor 102, either during the paying out of the tape 26, 32 out of the housing 34, 64, and/or the retraction of the tape 26, 32 into the housing 34, 64. The processor 104 may be configured to output this information to the digital display 108 for display to the user, and/or the processor 104 may be configured to output this information to the remote server 115 for reading by a user at that location.

The processor 104 may be configured by the user to "zero" the distance measurement of the tape 26, 32 at any desired position along the length of the tape 26, 32. For example, the user can pay out a foot of tape 26, 32 and then "zero" the digital measurement unit 24 such that the distance measurement starts at this point along the tape 26, 32.

The processor 104 may be configured to display the length measurement in Metric or English units. The user can change this display by using the user interface 110.

The processor 104 may be configured to know that the tape 26, 32 is a certain amount of feet in length. The processor 104 may be configured to track the length of the tape 26, 32 paid out and then determine how much length of tape 26, 32 remains in the device 22, 30. The processor 104 may be configured to output this information to the digital display 108 for display to the user, and/or the processor 104 may be configured to output this information to the remote server 115 for reading by a user at that location.

The assemblies 20, 28 perform cable pulls and provides distance measurements simultaneously. This assemblies 20, 28 are capable of providing accurate length measurements repeatedly throughout the entire life of the assemblies 20, 28.

While a particular structure for the fish tape device 22 and for the duct rodder device 30 is shown and described, it is to be understood that the devices 22, 30 can take other forms and the devices 22, 30 are not limited to the embodiment shown in the drawings.

While preferred embodiments of the present invention are shown and described, it is envisioned that those skilled in the art may devise various modifications of the present invention without departing from the spirit and scope of the appended claims.

What is claimed is:

1. An assembly comprising:
   one of a fish tape device and a duct rodding device, the device having an opening through which a user's hand can be inserted, and a flexible tape provided in the housing, an end of the tape having an eye thereon configured to be connected to a cable or wire, the tape being capable of being paid out of the housing and retracted into the housing; and
   an optical sensor attached to the device, the optical sensor being positioned proximate to the tape, the optical sensor using digital image correlation to take successive images of the tape as the tape passes by the optical sensor to determine a length of tape that has passed by the optical sensor; and
   a processor in communication with the optical sensor, the processor configured to calculate a length measurement of tape that has passed by the optical sensor.

2. The assembly of claim 1, wherein said optical sensor is an optoelectronic sensor.

3. The assembly of claim 2, wherein the optical sensor comprises one or more light-emitting diodes and an imaging array of photodiodes to detect movement relative to the underlying surface, and an image capturing device.

4. The assembly of claim 2, wherein said optical sensor comprises a coherent laser light and an image capturing device.

5. The assembly of claim 1, wherein said tape is formed of any one of steel, nylon, plastic, fiberglass, stainless steel and flexible steel braid.

6. The assembly of claim 1, wherein said tape is devoid of markings.

7. The assembly of claim 1, further including a digital measurement unit attached to the device, and the optical sensor is housed in the digital measurement unit.

8. The assembly of claim 7, wherein the processor is housed in the digital measurement unit.

9. The assembly of claim 1, further comprising a digital display in communication with the processor and configured to display information to a user, and a user interface in communication with the processor and configured to allow a user to toggle between readouts and settings.

10. The assembly of claim 1, further comprising a transceiver and an antenna, said transceiver in communication with said processor and configured to convey information to a remote server.

11. The assembly of claim 1, wherein the optical sensor is positioned proximate to the tape as the tape exits the device.

12. A method comprising:
providing one of a fish tape device and a duct rodding device, the device comprising a housing having an opening through which a user's hand can be inserted, and a flexible tape provided in the housing, an end of the tape having an eye thereon;
detecting by an optical sensor mounted in the device that a tape is being passed by the optical sensor, the optical sensor capable of taking images of the tape;
using digital image correlation to take successive images of the tape as the tape passes by the optical sensor;
determining a length of tape that has passed by the optical sensor;
outputting a length measurement; and
retracting the tape into the device after a cable or wire has been attached to the eye of the tape.

13. The method of claim 12, wherein the detecting is performed during paying out of the tape from the device.

14. The method of claim 12, wherein the detecting is performed during retraction of the tape into the device.

15. The method of claim 12, wherein the outputting the length measurement is performed by displaying the information on a display provided on the device.

16. The method of claim 12, wherein the outputting a measurement of the length measurement is performed by displaying the information on a server which is remote to the device.

17. The method of claim 12, further comprising:
paying out an amount of tape from the device to be at a location; and
zeroing the length measurement of the tape at said location.

18. The method of claim 12, wherein the length measurement is displayed in Metric or English units, and a user can toggle between said units.

19. The method of claim 12, further comprising:
paying out an amount of tape from the device; and
determining the amount of tape remaining in the device.

20. The assembly of claim 1, further comprising a cable or wire.

* * * * *